United States Patent
Bizcarguenaga Ansola

(10) Patent No.: US 10,562,434 B2
(45) Date of Patent: Feb. 18, 2020

(54) CONFIGURABLE CARRIER FOR TRANSPORTING BICYCLES INSIDE A VEHICLE

(71) Applicant: REGEBAT S. DE R.L. DE C.V., Jalisco (MX)

(72) Inventor: Juan Bosco Bizcarguenaga Ansola, CDMX (MX)

(73) Assignee: Juan Bosco Bizcarguenaga Ansola, CDMX (MX)

( * ) Notice: Subject to any disclaimer, the term of this patent is extended or adjusted under 35 U.S.C. 154(b) by 0 days.

(21) Appl. No.: 16/083,330

(22) PCT Filed: Mar. 11, 2016

(86) PCT No.: PCT/MX2016/000027
§ 371 (c)(1),
(2) Date: Sep. 7, 2018

(87) PCT Pub. No.: WO2017/155382
PCT Pub. Date: Sep. 14, 2017

(65) Prior Publication Data
US 2019/0070994 A1  Mar. 7, 2019

(30) Foreign Application Priority Data
Mar. 9, 2016 (MX) .................. MX/u/2016/000102

(51) Int. Cl.
*B60P 3/00* (2006.01)
*B60P 3/075* (2006.01)
*B60R 11/00* (2006.01)
*B60N 2/20* (2006.01)

(52) U.S. Cl.
CPC .............. *B60P 3/075* (2013.01); *B60R 11/00* (2013.01); *B60N 2/206* (2013.01); *B60R 2011/0003* (2013.01)

(58) Field of Classification Search
CPC .. B60P 3/075; B60R 11/00; B60R 2011/0003; B60N 2/206
USPC ......................................................... 224/572
See application file for complete search history.

(56) References Cited

U.S. PATENT DOCUMENTS

| 2,797,033 A * | 6/1957 | Rasbach | A47B 81/005 224/275 |
| 3,014,759 A * | 12/1961 | Bing | B60R 7/043 297/188.06 |
| 3,326,385 A * | 6/1967 | Pinkerton | B60R 7/14 211/4 |
| 5,495,969 A * | 3/1996 | Cardenas | B60R 7/14 211/195 |
| 6,135,332 A * | 10/2000 | Eleam | B60R 7/043 224/275 |
| 6,231,017 B1 * | 5/2001 | Watkins | B60R 11/0211 248/274.1 |
| 6,279,799 B1 * | 8/2001 | Horton | B60R 7/14 211/64 |

(Continued)

*Primary Examiner* — Peter N Helvey
(74) *Attorney, Agent, or Firm* — Perry + Currier Inc.; Alan F Feeney

(57) ABSTRACT

The present invention relates to a configurable bicycle carrier that enables bicycles to be transported inside a motor vehicle. Its versatile design allows it to be assembled into different configurations that facilitate the adaptation thereof to the backrest of any vehicle seat without sacrificing safety when transporting bicycles.

6 Claims, 7 Drawing Sheets

(56) References Cited

U.S. PATENT DOCUMENTS

| | | | | |
|---|---|---|---|---|
| 6,315,180 | B1* | 11/2001 | Watkins | B60R 11/04 224/275 |
| 6,405,909 | B1* | 6/2002 | Burnett | B60R 7/043 211/64 |
| 6,427,887 | B1* | 8/2002 | Chain | B60R 7/00 224/275 |
| 9,781,900 | B2* | 10/2017 | Iinan | A01K 1/0272 |
| 2004/0050889 | A1* | 3/2004 | Shafer, Jr. | B60R 5/045 224/403 |
| 2004/0112931 | A1* | 6/2004 | Swaim | A45C 7/0095 224/585 |
| 2004/0262345 | A1* | 12/2004 | Polburn | B60R 7/005 224/275 |
| 2016/0031384 | A1* | 2/2016 | Lieberknecht | B60R 5/04 224/543 |

* cited by examiner

CONFIGURABLE CARRIER FOR TRANSPORTING BICYCLES INSIDE A VEHICLE

TECHNICAL FLIED OF THE INVENTION

The present invention relates to a configurable carrier for transporting bicycles inside a motor vehicle.

OBJECT OF THE INVENTION

The present invention is a configurable carrier for transporting bicycles inside the vehicle in a safe manner, optimizing the space required for its installation. By virtue of the flexibility of its design, it can be configured in multiple ways, facilitating its installation in small vehicles. Moreover, one of the advantages of this invention is that transporting bicycles inside the vehicle makes it possible to protect them (both the bicycle and the carrier) from theft, contrary to what happens with bicycles that are transported on a carrier located on the rear portion of the vehicle or when they are transported in accessories placed on the roof of the vehicle. An additional advantage is that the present invention does protect the bicycle from weather conditions and resolves the specific problem that occurs when bicycles are transported on the roof of the vehicle, namely that the vehicle transporting them is prevented from entering some parking lots with a height limit. In addition, when the bicycle is placed on the back of the vehicle, there is a risk that it wil be damaged by another vehicle which, while traveling, does not properly calculate the distance between that vehicle and the vehicle in front of it that is carrying the bicycle in the back and hits both the bicycle and the carrier.

BACKGROUND

Different proposals exist for transporting bicycles on a vehicle, most of which have been designed to transport the bicycle on the outside of the vehicle. There are few proposals that enable a bicycle to be transported safely inside the vehicle.

U.S. Pat. No. 9,039,263 B2, published on 26 May 2015, discloses a bicycle mount that is positioned at the rear end of a motor vehicle in an extensible manner the bicycle carrier comprises a loading frame, an internally slidable member that is movably disposed in the loading frame, and a loading element that is pivotably disposed in the slidable member.

As can be seen from the cited document, there is no possibility of the carrier being placed inside a vehicle.

U.S. Pat. No. 5,025,932, dated 25 Jun. 1991, discloses a secure bicycle carrier that is designed for placement on the rear part of the vehicle and fastened to the towing structure, so that invention does not enable a bicycle to be transported inside a motor vehicle.

Other options for transporting bicycles inside a vehicle with a rear door, such as SUV-type vans, propose a carrier for the bicycle front fork that is secured by an element (wooden beam, plank or rail) transverse to the longitudinal axis of the vehicle and placed inside of the vehicle at the rear and thereof; the transverse element is secured to the floor of the vehicle by means of screws in such a way that the bicycle is introduced into the vehicle from back to front.

Among the most common commercial options is one known as Veloboy®, which employs a metallic structure to which bicycles are secured and that is introduced into the vehicle by means of small wheels that are integrated into the structure. Once inside the vehicle, bicycles are secured by means of tapes attached to the anchor points of the vehicle.

JSK® from Taipei Cycle: It uses the same principle as VeloBoy, i.e., a metallic structure with wheels that slides inside the vehicle. In this case, the manufacturer does not include information about the attachment of the bicycles to the anchoring points of the vehicle.

Bikeinside®. This solution is based on the use of a bar that adjusts manually to the width of the interior of the vehicle. The rubber parts at the ends generate the friction needed to immobilize the bar. The fastening bases for the bicycles are positioned along the length of the bar. The manufacturer does not indicate that tapes or other devices are required in order to secure the bicycle. This system can also damage (scrape) parts of the vehicle on which the bar is positioned.

Saris Trap®: In this case, the solution proposes a plate that is placed on the floor inside the vehicle. The plate has rubber parts on the bottom to prevent it from sliding, and it has several slots where the fastening elements for the front bicycle fork are installed. The manufacturer does not indicate that tapes or another method of anchoring the bicycles is required in order to prevent them from moving. On the contrary, the manufacturer includes screws for securing the plate to the vehicle through holes drilled in the floor.

Renowned companies such as Thule offer a model for transporting bicycles inside the vehicle but warn that they are not universal and that you have to verify in which vehicle models it can be used. The official Thule website does not present any information about its model 592 for interiors.

DETAILED DESCRIPTION OF THE INVENTION

The present invention uses grooved profiles, preferably of the V-slot type. Unless otherwise indicated, the profiles used in the present description are of the V-slot type.

Each of the V-slot profiles used in the present invention have a square cross section. The V-slot profile (or "V" slot) has four projections that start from the edges of a likewise square-sectioned core, which has a round hole in its interior along the entire length of the profile. Each projection at the end opposite the square-sectioned core ends with a profile in the form of a "V"-shaped right angle, so that the "V"-shaped profiles form on each face of the profile a channel through which coupling elements such as nuts, special screws, or double-coupling elements for joining two channels can slide. In the V-slot profiles, the tubular-shaped core has a round longitudinal hole that enables assembly through the ends. These are profiles that are designed to build sliding mechanical blocks or assemblies. The V-slot profiles are widely known, commercially available profiles.

Figure 1:
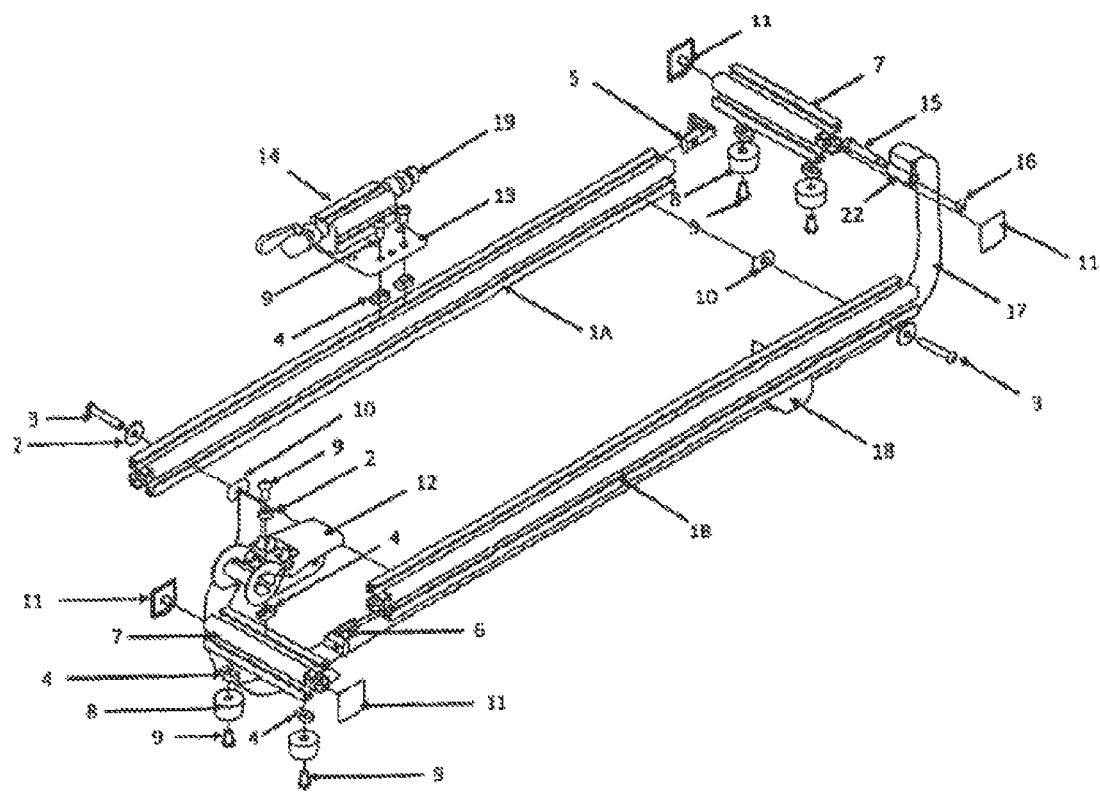
FIG. 1 shows an exploded view of the configurable bicycle carrier of the present invention.

With reference to FIG. 1, an exploded image is shown that illustrates the preferred configuration for the configurable carrier of the present invention, which consists of two long profiles (1A and 1B), both of the "V-slot" type, round washers (2), long dome-head screws (3), profile nuts (4), corners for V-slot profile (5), set screws for corner (6), short profiles (7), rubber parts (8), short dome-head screws (9), special washers (10), plastic caps (11), strap-adjusting ratchet (12), support plate (13), fork bracket (14), screw for strap (15), strap screw nut (16), strap (17), strap guards (18) and screw with snap-in fastener (19).

Figure 2A:
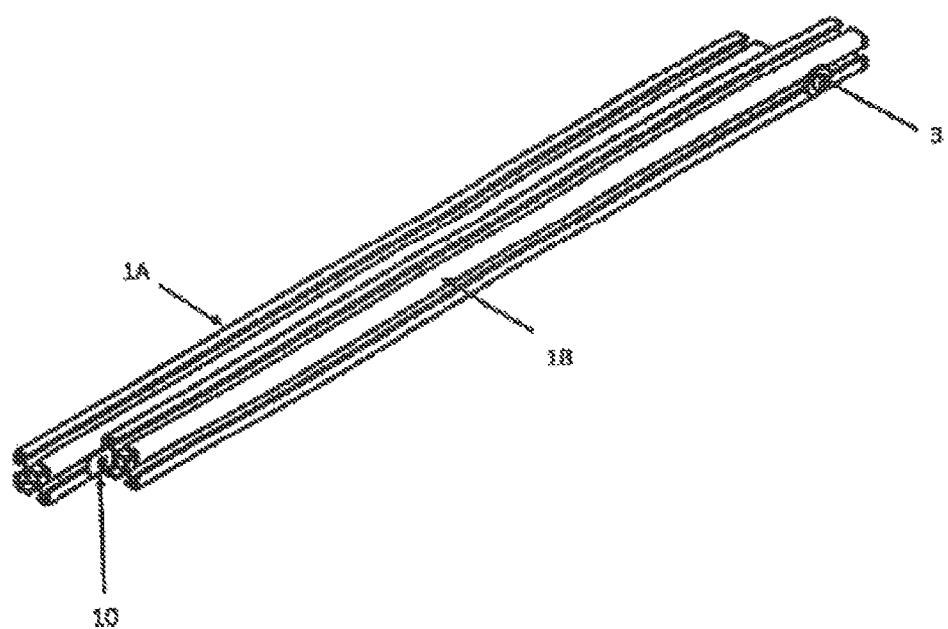
FIG. 2A shows how to assemble the two long V-slot-type profiles in parallel.
Figure 2B:
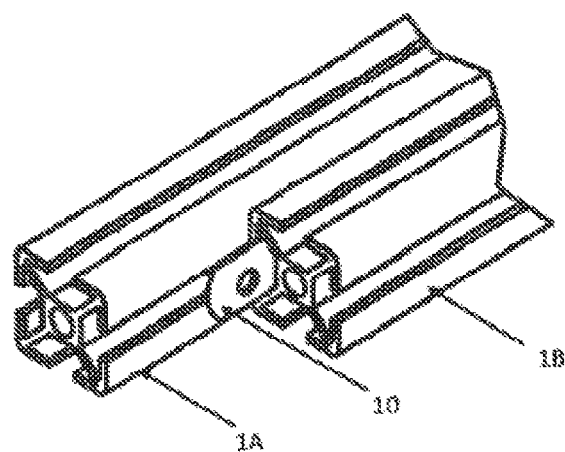
FIG. 2B shows in detail how to assemble the two long V-slot-type profiles in parallel.

According to FIGS. 1, 2A and 2B, in order to form the main body of the configurable bicycle carrier, the long profiles (1A and 1B) of the V-slot type described previously are coupled in parallel by means of the long dome-head screws (3) that pass through a round washer (2), the front end of the first long profile (1A), and a special washer (10) that slides through one of the slots of the long profile (1B) until it reaches the desired position for coupling. Conversely, a long dome-head screw (3) is inserted into the back of the long profile (1B) and first passes through a round washer (2) and then the long profile (1B) in order to then be screwed into a special washer (10) that is inserted into the back of the long profile (1A). The special washers (10) are constructive elements that have a threaded through hole, a thinner threaded section, and a wider flat section. The screw is tightened and checked to ensure that it allows for the parallel sliding of both of the long profiles (1A) and (1B).

Figure 3:
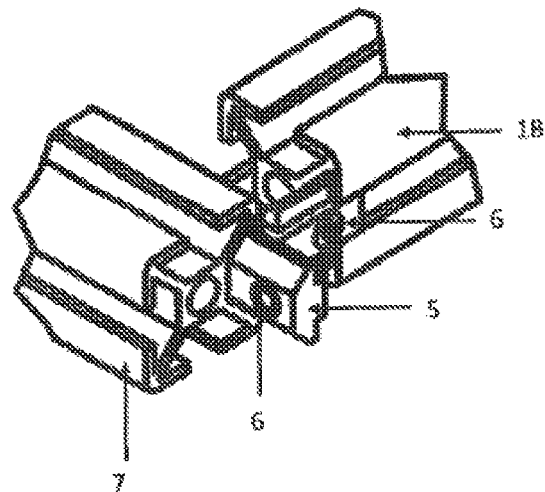
FIG. 3 shows detail of the perpendicular assembly of two V-slot profiles.

Once the long profiles (1A) and (1B) have been joined, one of the short profiles (7) is joined to one end of the long profile (1A) and the other to the opposite end of the long profile (1B), so that both short profiles (7) act as a stop for the sliding of the long profiles (1A) and (1B) (FIG. 3). In order to couple each long profile (1A) or (1B) with a short profile (7), corners for V-slot profile (5) are used that are fastened to the long sections (1A) and (1B) by means of set screws for corners (6). Each of the arms that form a corner for V-slot profile (5) has a section that has the same shape as the V-slot profile channel, which facilitates the insertion and coupling thereof by sliding. Plastic caps (11) are placed at the ends of the (long and short) profiles in order to give a better appearance to the product.

Figure 4:
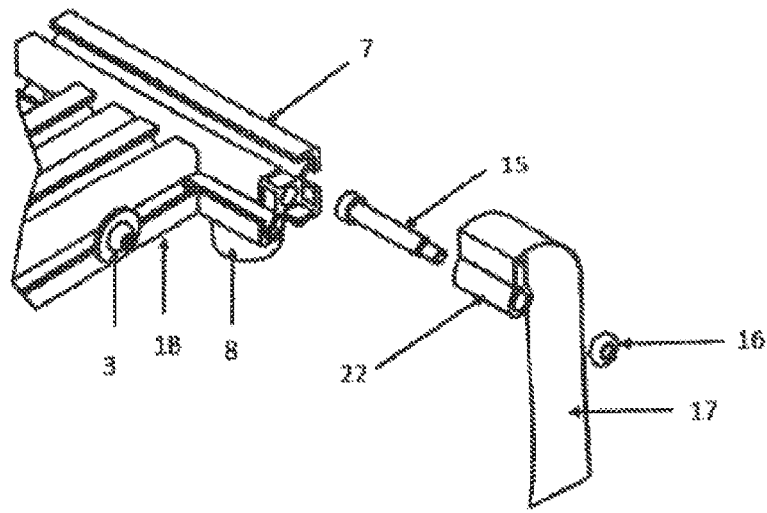
FIG. 4 shows detail of the strap assembly with the V-slot profile.

The strap (17) that is used to adjust the configurable bicycle carrier (FIG. 4) has at one end a clamp (22) that ends in a tubular section through which the strap screw (15) is inserted. Once the strap screw (15) has been inserted into the clamp (22), the strap (17) is secured by means of a strap screw nut (16), and the assembly slides along one of the channels of one of the short profiles (7).

Figure 5:
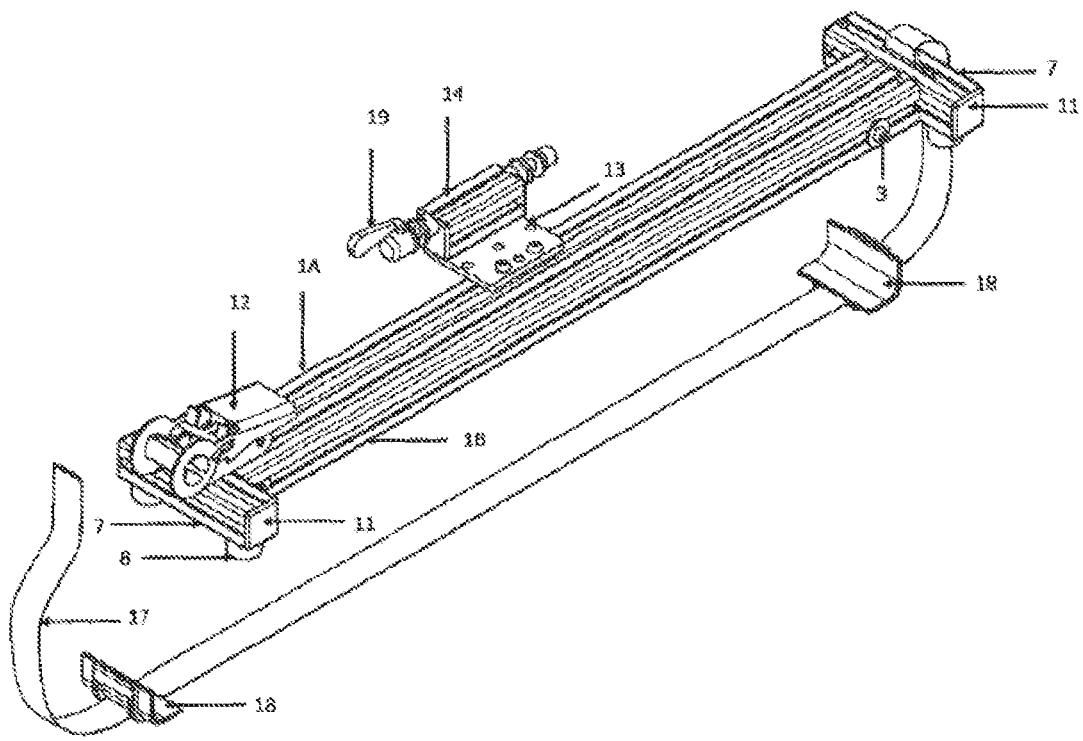
FIG. 5 shows a perspective view of the preferred embodiment of the configurable bicycle carrier.

According to FIGS. 1 and 5, the strap-adjusting ratchet (12) is secured to the short profile (7) opposite the clamp (22) by means of a short dome-head screw (9), round washer (2), and profile nut (4). A support plate (13) that secures the fork bracket (14) s placed on the long profile (1A). The fork bracket (14) is formed by a section of V-slot profile (FIGS. 5, 6 and 10) that is passed through longitudinally by a screw with snap-in fastener (19) whose dimensions exceed the length of the section of V-slot profile of the fork bracket (14), enabling the bicycle fork (21) to be inserted at each end of the screw with snap-in fastener (19). Once the bicycle fork (21) has been inserted into the ends of the screw with snap-in fastener (19), it is secured by means of the lever of the screw with snap-in fastener (19).

Figure 6:
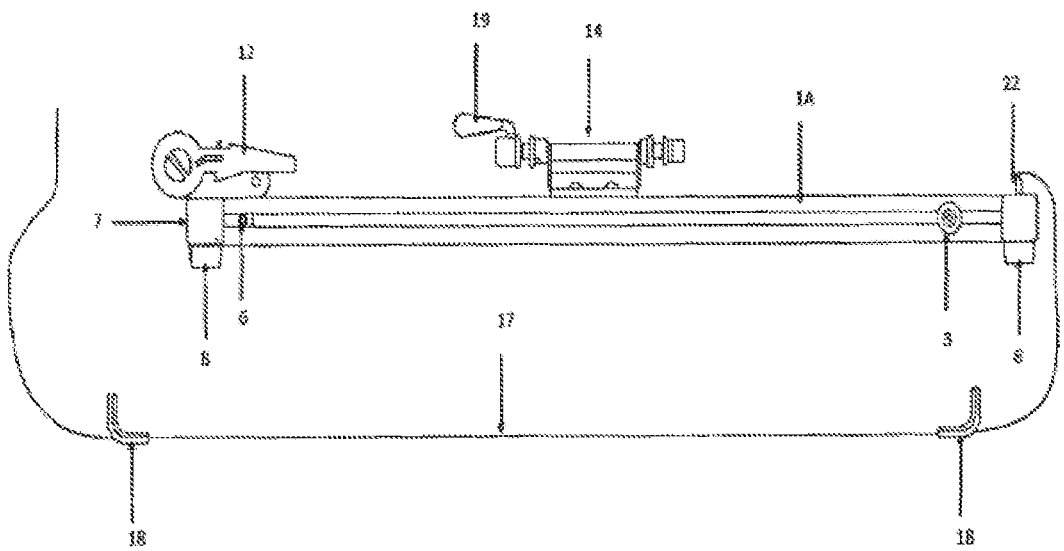
FIG. 6 shows a front view of the configurable bicycle carrier illustrating the primary functional elements.

FIG. 6 shows a front view of the configurable bicycle carrier in which the strap (17) can be seen that s used to secure the configurable bicycle carrier to the rear (or passenger) seat of a motor vehicle. Also visible in the same figure are the strap guards (18), which are sliding auxiliary elements that are used to position the configurable bicycle carrier while simultaneously protecting the strap (17) and the seat of the motor vehicle. In the middle part of the long profile (1A), it is possible to see the fork bracket (14); the strap-adjusting ratchet (12) can be seen at one end of the same long profile (1A), and the clamp (22) of the strap (17) can be seen at the end opposite the strap-adjusting ratchet (12). In addition, one can see the rubber parts (8) that are located on the underside of the short profiles (7), one at each end of the short profile (7), whose function is to prevent the backrest of the seat of the motor vehicle from being damaged.

Figure 7:
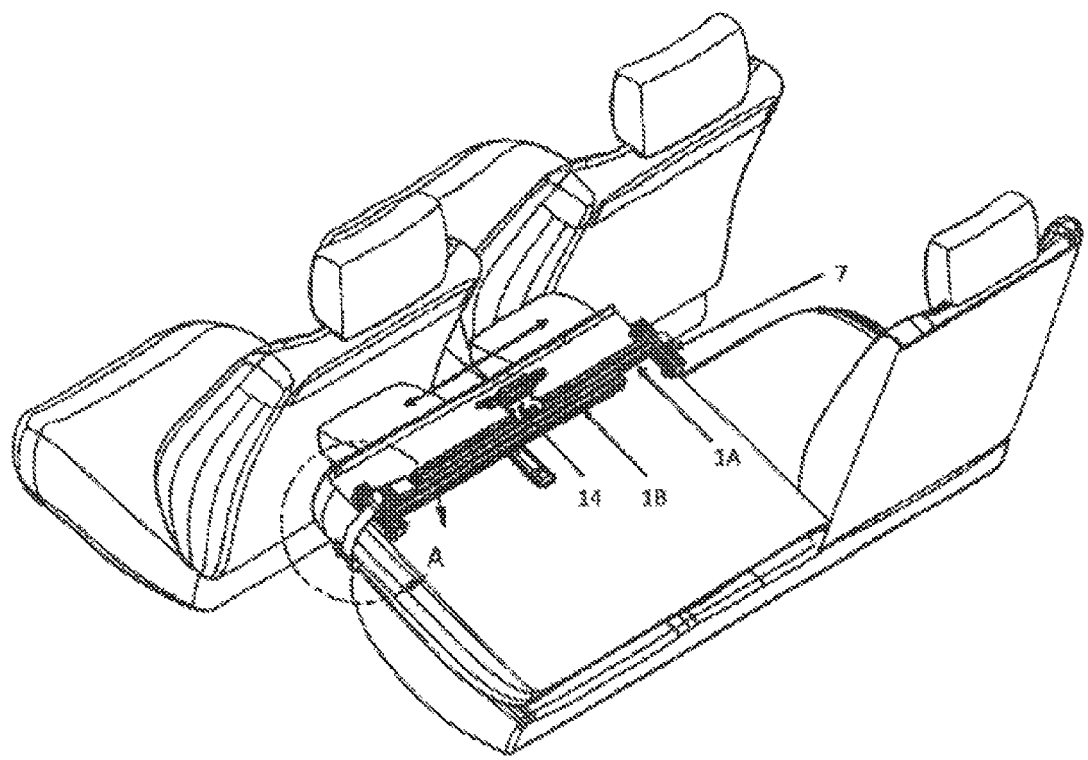
FIG. 7 shows the manner in which the configurable carrier is placed so as to engage around the backrest of the rear seat of the motor vehicle.

FIGS. 5 to 7 show the preformed embodiment for the configuration and use of the configurable bicycle carrier of the present invention, wherein the configurable bicycle carrier slidably adjusts to the width of the seat backrest of a motor vehicle and is subsequently held by the strap (17) that encircles the backrest, taking care that the strap protectors (18) are located on the edges of the backrest of the seat; once the backrest of the seat has been encircled, the strap (17) is inserted into the strap-adjusting ratchet (12), which is used to tighten the strap (17), securing the position of the configurable bicycle carrier.

Figure 8:
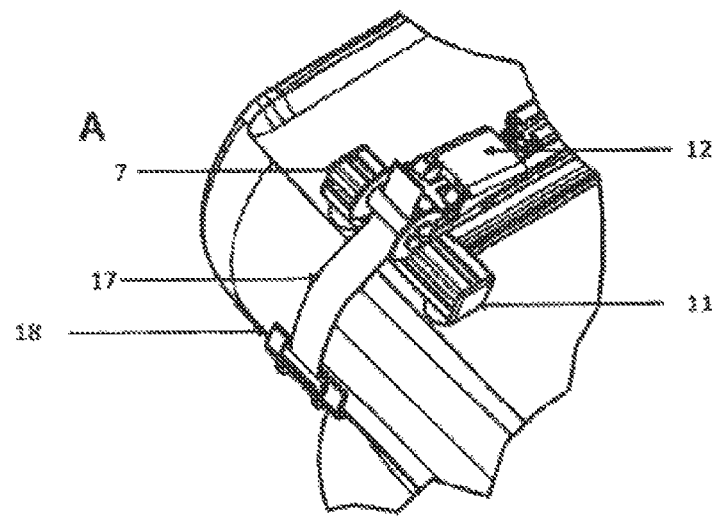
FIG. 8 shows detail of adjusting the strap to the backrest of the rear seat of a motor vehicle by means of a strap that engages around the backrest of the rear seat and a strap-adjusting ratchet, which tightens the strap.

For better illustration, FIG. 8 shows in detail the manner in which the strap protectors (18) are positioned in order to avoid damaging the backrest of the seat and the manner in which the strap (17) is inserted in order to be tensioned by the strap-adjusting ratchet (12) that is fixed to the short profile (7). Plastic caps (11) that improve the aesthetic appearance of the invention are also visible.

Figure 9:
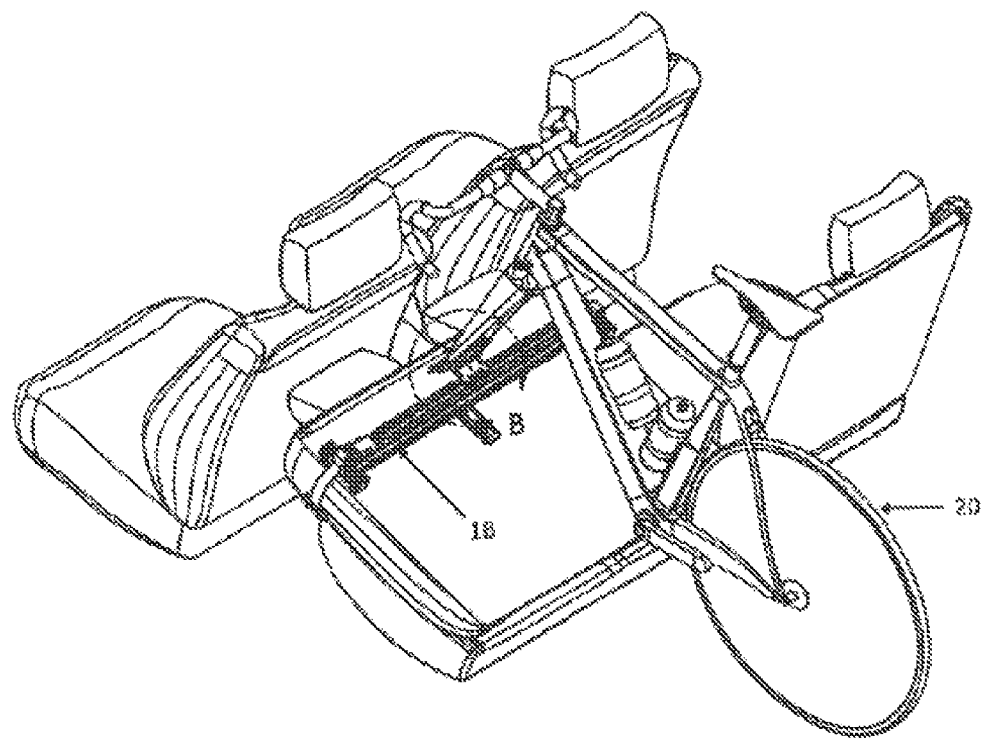
FIG. 9 illustrates the manner in which the bicycle is positioned and secured by means of the configurable carrier of the present invention.
Figure 10:
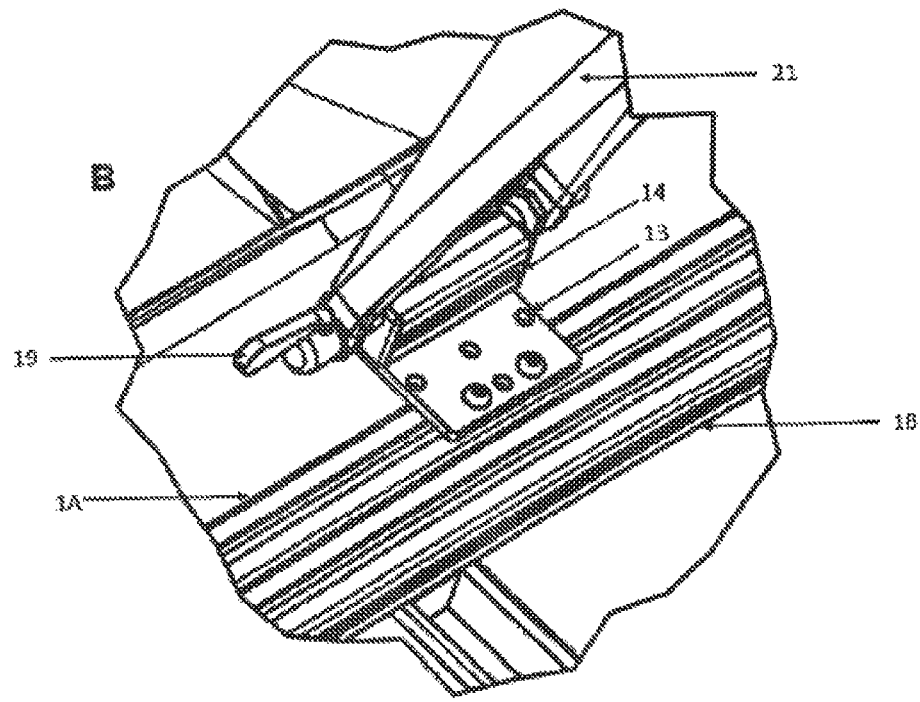
FIG. 10 shows detail of how the bicycle is secured by the front bicycle fork.

In order to demonstrate the use of the configurable bicycle carrier, FIG. 9 illustrates the position that the bicycle (20) must assume in the configurable bicycle carrier of the present invention. Likewise, FIG. 10 shows in detail the manner in which the bicycle fork (21) for the front bicycle wheel (20) s inserted onto the ends of the screw with snap-n fastener (19), after which the pressure element is rotated, thereby securing the bicycle (20) to the fork bracket (14).

Figure 11:
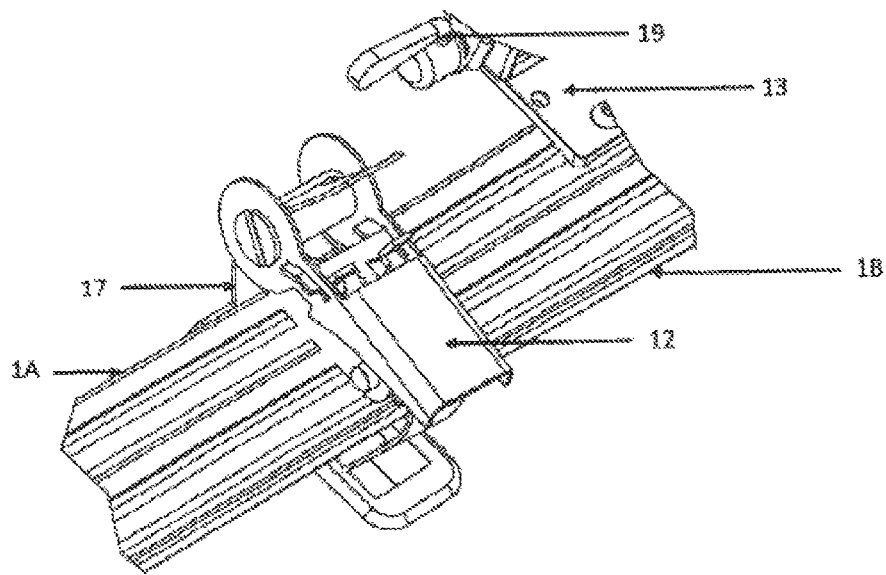
FIG. 11 shows the option of how to secure the configurable bicycle canter to the backrest of the vehicle's rear seat using the hook for the baby seat.

As can be seen from FIG. 11, the strap-adjusting ratchet (12) can also be placed transversely over the middle pert of the long profiles (1A) and (1B), facilitating the installation of the configurable bicycle carrier on the baby seat hook (not shown) in vehicles having this element. In this position, it is possible to assemble and install the configurable bicycle carrier in different ways. It is important to mention that the baby seat hook is horizontal in some vehicle models with respect to the position of the vehicle's backrest and is vertical in other models, which does not pose a problem for the present invention, since the strap-adjusting ratchet mechanism (12) and strap (17) can be installed in either of the two orientations.

Figure 12:
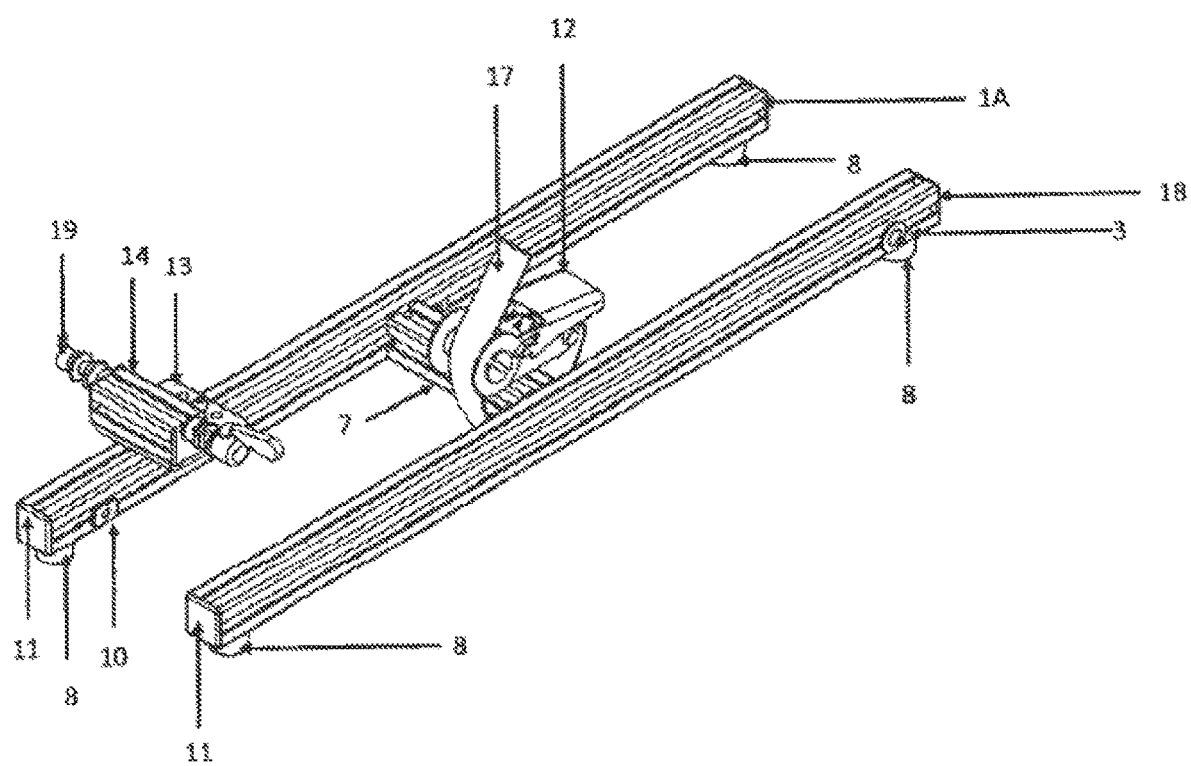
FIG. 12 shows a different way of using the configurable bicycle carrier by means of an "H"-shaped assembly.

FIG. 12 shows the "H" configuration of the configurable bicycle carrier of the present invention, in which the long profiles (1A) and (1B) are placed in a parallel position separated by a short profile (7) on which the strap-adjusting ratchet (12) is placed in order to secure the configurable bicycle carrier to the back of the backrest, with the carrier being secured on the baby seat hook. In the "H" configuration, it is possible to place a fork bracket (14) on each long profile (1A) and (1B) in a transverse position with respect to the long profile (1A) or (1B), thus eliminating the use of one of the short profiles (7).

Figure 13:
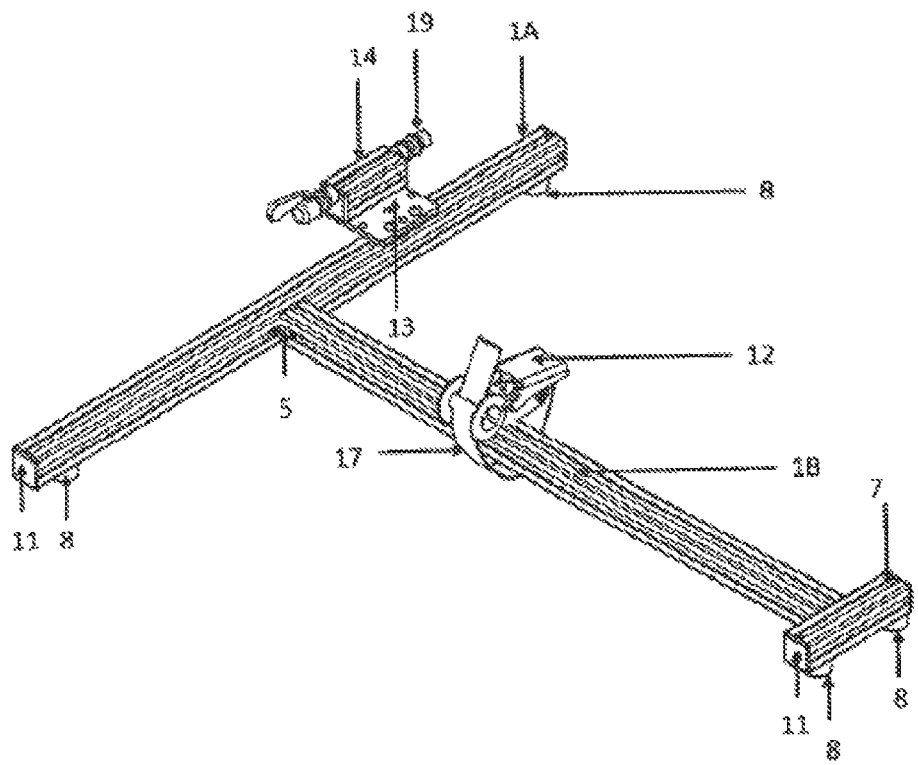
FIG. 13 shows a different way of using the configurable bicycle carrier by means of a "T"-shaped assembly.

Another way in which the configurable bicycle carrier can be installed is shown in FIG. 13, which illustrates a "T"-shaped configuration. In the "T" configuration, it is possible to eliminate one of the short profiles (7); in order to do this, it is necessary to couple the long profiles (1A) and (1B) in a perpendicular position, with the long profile (1A) being transverse to the longitudinal axis of the backrest of the vehicle seat. In the "T" configuration, the configurable bicycle carrier is secured to the rear of the backrest of the motor vehicle by means of the ratchet-adjusting strap (12), which is positioned in the middle of the long profile (1B) and secures the configurable bike mount to the baby seat hook, which is normally located on the back of the backrests of motor vehicles.

Figure 14:
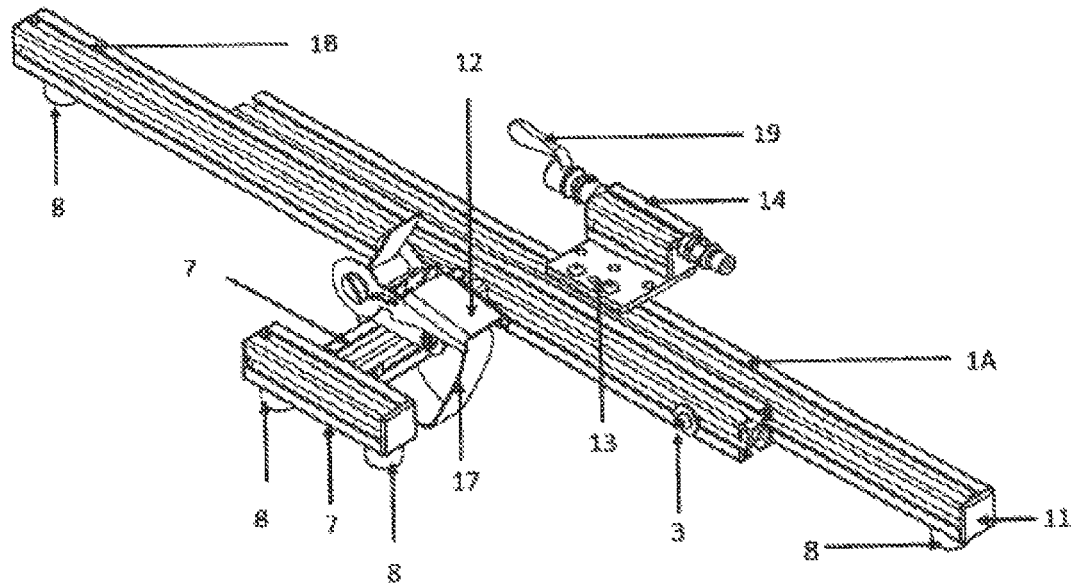
FIG. 14 shows a different configuration for using the configurable bicycle carrier while secured to the backrest of the rear seat of the motor vehicle.

In order to avoid using a strap (17) that is too long, when there is a baby seat hook on the rear part of the backrest of the motor vehicle, the preferred configuration can be modified (FIG. 14) in such a way that, once the long profiles (1A) and (1B) are joined in parallel, the short profiles (7) assembled in an inverted "T" shape are coupled with the long profile (1B) in such a way that the strap-adjusting ratchet mechanism (12) and the strap (17) are secured to the short profile (7) perpendicular to the long profiles (1A) and (1B), with the fork bracket (14) being secured to the long profile (1B).

For greater clarity, a list of parts is presented below:
1. Long profiles (1A and 1B)
2. Round washers
3. Long dome-head screws
4. Profile nuts
5. Corners for V-slot profile
6. Set screws for corner
7. Short profiles
8. Rubber parts
9. Short dome-head screws
10. Special washers
11. Plastic caps
12. Strap-adjusting ratchet
13. Support plate
14. Fork bracket
15. Strap screw
16. Nut for strap screw
17. Strap
18. Strap guards
19. Screw with snap-in fastener
20. Bicycle
21. Bicycle fork
22. Clamp

The invention claimed is:

1. A configurable bicycle carrier, characterized in that it is formed by two long slotted or grooved profiles, at least one slotted or grooved short profile that is perpendicular to at least one of the long profiles, a bicycle fork bracket that is positioned on one of the long profiles, a strap-adjusting ratchet mechanism and strap that are positioned on at least one of the short or long profiles, with the orientation of the strap being perpendicular to the profile to which the strap-adjusting ratchet mechanism is secured, and a strap that is used to secure the carrier to the back of the backrest of the rear seat of a motor vehicle, with the backrest of the seat being folded down and the strap being in a position transverse to the longitudinal axis of the vehicle seat.

2. The configurable bicycle carrier as claimed in claim 1, characterized in that the long profiles are slidably coupled in a parallel position and the short profiles are placed in a position that is perpendicular to the long profiles, one by one only from the ends of each long profile, with each of the short profiles being situated opposite the respective long profile, that a strap is secured to one of the short profiles by a clamp and strap screw, and a strap-adjusting ratchet mechanism is secured to the other short profile in order to secure the strap from the opposing short profile, and that the strap engages around the backrest of the seat of a motor vehicle.

3. The configurable bicycle carrier as claimed in claim 1, wherein the long profiles are slidably coupled in a parallel position and the short profiles are placed perpendicular to the long profiles, one by one only from the ends of each long profile, with each of the short profiles being situated opposite the respective long profile; wherein a strap is secured to one of the short profiles by means of a clamp and strap screw, and a strap-adjusting ratchet mechanism is secured to the other short profile in order to secure the strap from the opposite short profile in order to engage around the backrest of the seat of a motor vehicle, characterized in that the configurable bicycle carrier can be adjusted to the width of the seat backrest of the motor vehicle by sliding the long profiles.

4. The configurable bicycle carrier as claimed in claim 1, wherein the profiles are placed in an "H" shape, with the long profiles being aligned with the longitudinal axis of the backrest of the vehicle seat in a parallel position and coupled by means of a short profile that is positioned between the long profiles at a medium distance from the long profiles, with the short profile being perpendicular to the long profiles; and wherein the strap-adjusting ratchet mechanism and strap are mounted on the short profile, with the strap being aligned with the long profiles and secured to the baby seat hook.

5. The configurable bicycle carrier as claimed in claim 1, characterized in that long profiles are assembled in a perpendicular position in a "T" shape, with a first long profile being aligned with the longitudinal axis of the seat backrest of the motor vehicle and the second long profile being positioned transverse to the longitudinal axis of the backrest of the vehicle seat, that the first long profile is coupled with the front end of the second long profile and a short profile is coupled with the rear end of the second long profile in the perpendicular position, with the strap-adjusting ratchet mechanism and strap being on the second long profile, and that the bicycle fork is located on the first long profile, with the strap being oriented transverse to the longitudinal axis of the backrest of the vehicle seat and secured to the baby carrier hook of the seat backrest.

6. The configurable bicycle carrier as claimed in claim 1, wherein the long profiles are slidably coupled in a parallel position transverse to the longitudinal axis of the backrest of the seat of the motor vehicle; wherein the bicycle fork bracket is positioned on a first long profile and two short profiles that are assembled into an inverted "T" shape are coupled with the rear of the second long profile, with a first short profile being positioned perpendicular to both long profiles and a second short profile being aligned with the long profiles, characterized in that the strap-adjusting ratchet mechanism and strap are positioned on the short profile perpendicular to the long profiles and secured to the baby carrier hook of the seat backrest.

\* \* \* \* \*